United States Patent Office 2,928,751
Patented Mar. 15, 1960

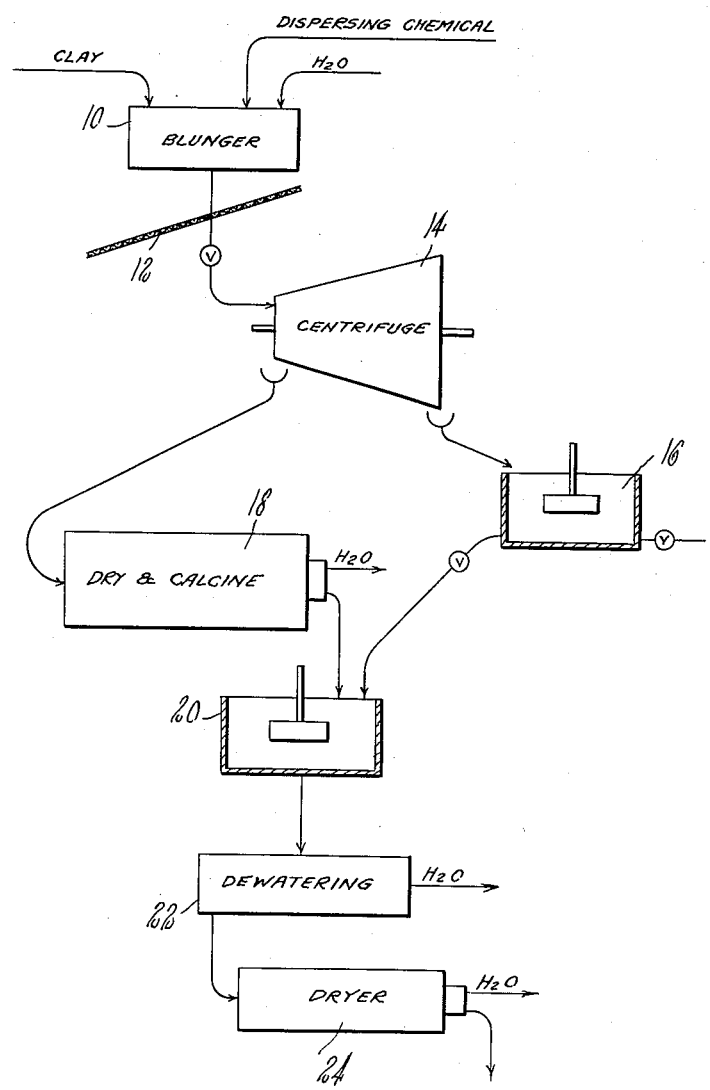

2,928,751

CERAMIC SUBSTANCE AND METHOD OF MAKING

Sanford C. Lyons, Bennington, Vt., assignor to Georgia Kaolin Company, Elizabeth, N.J., a corporation of New Jersey Application March 22, 1956, Serial No. 573,229

11 Claims. (Cl. 106—72)

This application is a continuation-in-part of my copending application Serial No. 479,377, filed January 3, 1955 and later abandoned. The invention relates to a controllable and reproducible ceramic substance and a method of making the same. Heretofore the substances of which ceramic articles have been made have been mainly clays of the kaolinite type with or without the admixture of other ingredients. Since the natural deposits of clay vary considerably in composition and since there is liable to be variation in the composition in the clay taken from a single locality, the preparation of a substance to be made into ceramic articles has been guess work to a considerable extent.

The ceramist, from the dawn of history, has been of necessity an empiricist. As basic raw material, clay has been of such extremely fine particle-size that, literally, until within the last two decades no instruments were available whereby he could determine clearly the size, shape, or other basic features of these particles. Not only were clays very finely divided, but their particles have never been known to occur in nature in monodispersion, i.e., within a single narrow particle-size range. They are always variant in size, ranging from roughly 0.002" (50 microns) down to less than 1/1,250,000" diameter (0.02 micron), so that any measure of fineness control seemed impracticable.

Some idea of the complexities involved in this matter of particle-size distribution can be gathered from computations which have shown that in a single gram of clay consisting of particles having a diameter of 0.1 micron or less there will be near $10^{15}$ such articles. (See Table IV in "Some Ceramic Mechanisms and New Materials" by Koenig and Lyons in the April 1955 issue of Ceramic Age, page 26.)

Making the problem even more confusing, and only recently discovered, is the fact that certain clay particles suddenly change their shape at about two microns equivalent spherical diameter and each of the two differently shaped particles exert divergent effects upon the ceramic process and product. Since the early ceramist had no hint of these facts, and, furthermore, no control over them had he known about them, he literally had to proceed by guesswork. Consequently, there has been a high percentage of weak or defective articles by reason of the experimentation required to obtain satisfactory results. The troubles arise chiefly from dimensional changes occurring in firing and cooling the articles. The cause and control of such changes have not been clearly understood until recent developments in clay technology have not only made possible the segregation of the components of a clay but have thrown considerable light on the behavior of the individual components in the firing and cooling operations. In an effort to control the dimensional changes in ceramic substances, other components such as finely ground flint have been added to the clay.

Ground flint (quartz) undergoes a sharp dimensional change known as the "quartz inversion point" at about 600° C. At this temperature, many of the clay particles have already assumed their positions of initial set and as long as ground flint is used in the body in an effort to reduce shrinkage, the firing of the ware must be done very slowly at this approximately 600° C. temperature in order to give the dimensional stresses, caused by the flint phase, an opportunity to relieve themselves throughout the mass. This effect is observed both as the ware is heated up and also as it cools. Not only does this result in a slowing down of the firing process with consequent fuel consumption and of course a decrease in output per kiln, but it poses a constant danger to the structural quality of the ware itself. Consequently, if a non-shrinking component were available which did not have the objectionable dimensional change, it would be a valuable raw material for the ceramist. Such a material is described hereinbelow.

An object of the present invention is to provide an improved ceramic substance which is accurately reproducible so that uniform quality of products can be maintained, which results in ceramic structures of reduced shrinkage, increased strength and greater dimensional precision, and which can be fired faster, thus saving time and fuel. A method by which a substance of the foregoing character is obtained comprises segregating certain of the constituents, and then mixing together predetermined percentages of the constituents with or without any additional ingredients which may be desired. This method has been evolved as a result of recent research and experimentation with clays of different types. Examination of kaolinite clay under the high magnification made possible by the electron microscope has revealed that particle size plays a vital part in the behavior of the clay. There had been previous experimental evidence of a sharp difference between clay particles greater than 2 microns and particles smaller than 2 microns (equivalent spherical diameter) as respects their gloss-developing properties and their hiding power in paper coating, this discovery being described in the U.S. Patent to Maloney No. 2,158,987. More recent experimental techniques, including the use of electron microscopes, have demonstrated that kaolinitic particles of less than two microns equivalent spherical diameter are in the form of flat hexagonal crystal plates. Kaolinite particles having a size of two microns or more are stacks of such plates having face-to-face adherence. The plates vary somewhat in form. In clays suitable for paper-coating, relatively thick plates with fairly regular hexagonal contours predominate. In ceramic-type kaolins, including ball clay, the plates are generally thinner with ragged edges. The stacks also vary. In some clays the plates composing the stacks are generally arranged one above the other in a regular pile. In other clays the plates in most of the stacks are more or less irregularly arranged.

In view of the irregular shapes of most clay particles, the term "diameter" as applied herein to such particles is understood to mean equivalent spherical diameter, that is, the diameter of a sphere having the same sedimentation rate in water.

It has recently been clearly shown that there is a criticality about the dimensional point at which kaolinite particles cease to be found as flat hexagonal plates and that at which they become stacked agglomerates of these plates. So far as I am aware, no single perfect hexagonal kaolinite plate larger than about 2½ microns has ever been seen in photomicrographs. In fact, they are not often seen larger than 2 microns diameter. On the other hand, the long vermiculite-type stacked agglomerates are seldom seen smaller than 2 microns diameter.

It should be borne in mind that there is an equal criticality in the ceramic properties of these two different types of kaolinate particles.

The property of plasticity (with its concomitant properties of dry-strength and fired-strength) is, to a truly surprising degree, contributed by the plate-like fine particles. On the other hand, unfortunately, these same fine particles contribute high drying and firing shrinkage. Not only is this feature most embarrassing and troublesome to the ceramist because it renders his control of the dimensional precision of his finished wares difficult and uncertain, but more especially is this shrinkage feature undesirable in that it causes the development of strains within the ceramic body which finally result in minute shrinkage cracks which destroy the structural solidity of the ware and thereby greatly reduce its finished strength and/or utility.

In firing ceramic articles, observed expansion and contraction of the articles has given rise to speculation as to dimensional changes in the individual particles. modern microscopic studies have indicated that kaolinite stacks when heated to about 600° or over, expand lengthwise (accordion-fashion) with an increase of length of about 20%, and that this expansion appears to be irreversible. If such particles or stacks are heated up to 1000° C. or so, very little agglomeration of stacks occurs. At similar temperatures, however, there is extensive agglomeration of the colloidal particles (kaolinite plates). Hence it is evidently the colloidal and/or plate shaped particles in a ceramic clay which provide the cohesive strength of the article. It is also probable that the dissimilar dimensional changes in the stacks and plates when fired set up internal stresses which may result in cracks and render the article fragile. An object of the present invention is to reduce dimensional changes incident to firing by employing pre-calcined stacks in the ceramic material to be fired, such material being a mixture of definite ingredients in reproducible proportions. This makes possible a high degree of uniformity in the ceramic product, both in dimensions and physical properties, and makes possible a faster firing process which results in a saving of time and fuel.

From the foregoing, it is clear that both types of particles are required in ceramic bodies. The fine plate particles are required for strength while the coarser stack-like particles are required for their nonshrinkage contribution. It should be clear also that for different types of ware and for different sizes of ware, the optimum proportion of plates (strength-giving) to stacks (nonshrinking) will differ. Seldom, if ever, are natural clays found with such optimum proportions of plates to stacks. In the few cases where such may have existed, there has been no assurance whatever of continuity of supply and moreover, there has been no standard way to correct or control deviation therefrom.

In the present process, the natural clay is first segregated into its two differently shaped crystal particle components, viz., plates and stacks.

This is achieved by blunging crude clay into deflocculated aqueous suspension and effecting a sharp classification into two separate fractions at about 2 microns diameter. Details of a process particularly effective for this purpose are described in my U.S. Patents Nos. 2,085,537, 2,085,538 and 2,179,154. The fine particles (plates) are kept separate. The coarse particles (stacks) are dried and calcined to a temperature above 600° C. and preferably 1000° C. These are then blended back with the above mentioned fine particles (plates) in such proportions as are found to give the optimum properties of strength, shrinkage, etc., required for the particular purpose at hand. In addition to the original classification of the particles into groups consisting respectively of particles over and under 2 microns equivalent spherical diameter, a further classification may be made of the coarser particles. For example, it may be advantageous for some product to exclude particles originally greater than 10 microns. In such case, the first step of classification would be followed by a second step to separate particles within the 2–10 micron range from the larger particles, that is, those within the 10–50 micron range. The former fraction would be calcined, the latter fraction being put to some other use or discarded.

The term "calcine" as applied to clay is now commonly used in the industry to mean roasting or heating to high temperatures whether or not the resultant product is a powder or a cohesive mass, and it is so used herein. Thus by calcined clays is meant clays which have been strongly heated.

Clays of fortuitous and/or indiscriminate particle-size have in the past been calcined and then reground for use in ceramic bodies. However, these prior art calcined clays have embodied certain inferiorities and/or severe production difficulties which the instant invention obviates. So far as I am aware, no one has heretofore realized that by taking advantage of the removal of particles finer than about 2 microns it is possible to obtain kaolinite clays which can be calcined to a condition of being substantially "self-pulverized" after calcining. Clays calcined by the usual methods issue from the kilns in a form reminiscent of fragments of fire brick. This means that in order to make the latter usable in high grade ceramic wares, it is necessary to grind them. As all persons familiar with the art of grinding well know that it is not particularly difficult to grind fire brick to ordinary dimensions, e.g. 40 to 80 mesh, but when it must be ground to ceramic dimensions, that is with most of the particles having a diameter of 10 microns or less, the problem is of a totally different order of magnitude. In other words, the grinding of fire brick or calcined kaolin fine enough so that all of it will pass through a 325-mesh (43 microns) screen is no simple matter, but the problem of breaking the calcined mass down to dimensions of 10 microns or less for industrial purposes is commercially impractical. Since, as above noted, the simple expedient of prior removal of the particles smaller than 2 microns before calcining obviates this difficulty, a new production field is open to the ceramist.

It has been mentioned that by first separating the natural clay into its two component type crystals, and then recombining these components in various ratios, improved ceramic structures have been obtained by utilizing proportions of plates to stacks differing from those found in nature. A surprising and valuable further discovery was made when combinations of uncalcined plates with the separately calcined stacks were made. For reasons as yet not clear, many of the mixtures which contained calcined stacks instead of the natural uncalcined stacks gave fired strength far in excess of those obtained with any combinations which contained only the uncalcined stacks. This fact is considered to be one of the major discoveries in connection with this invention.

The drawing shows a diagrammatic layout of well-known pieces of apparatus which can be employed in producing my improved ceramic material.

A blunger 10 is employed to make a fluid slurry of kaolinite clay with a suitable dispersing chemical, such as sodium silicate or sodium phosphate, in a manner well-known in the art. The slurry is passed through a screen 12 or about 150 mesh for the removal of oversize particles. The slurry is then introduced into a suitable centrifuge 14 such as, for example, is shown in Patent No. 2,057,156, to separate most of the particles finer than 2 microns (plates) from the particles coarser than 2 microns (stacks). The former fraction is sent to a vat 16, the latter being sent to an oven 18 where the particles are dried and then strongly heated (600° to 1000° C.). This expands the individual stacks, such expansion being irreversible, and the resulting product is finely granular, the granules being friable. Complete separation of the coarse and fine particles in the centrifuge 14 is neither practicable nor necessary. A good product for the intended purpose can be obtained if the slurry of coarse particles discharged from the centrifuge contains up to 30% of fines (i.e., particles smaller than 2 microns).

If a fraction of a more limited range of particle size is desired for calcining, the coarser fraction from the centrifuge 14 is put through a second centrifuge for the subdivision and either of the resulting fractions may be sent to the oven 18.

The calcined stacks are discharged from the oven 18 to a vat 20 where they are mixed with a measured proportion of fine particles (plates) from the vat 16, the fine particles being conveniently supplied in a slurry. The mixture is then dewatered by filtering or otherwise at 22 and, for economical shipping, dried in a suitable drier 24. The resulting product is a novel and valuable ceramic material, the composition and characteristics of which can be depended on since the material can be accurately reproduced. Since the coarser particles (stacks) in the material have been already expanded, these particles will not expand further when a ceramic article of which they are a part is fired. This eliminates one previously troublesome dimensional change of ceramic articles together with the resultant internal stresses which have tended to weaken the ceramic product. I have also found that the pre-calcined stacks require a substantially smaller proportion of the uncalcined fine particles (plates) as a binder material to weld them together, when a ceramic article is fired, for the production of a mechanically strong product. A result of this is a substantially smaller shrinkage of the product while or after being fired. Although the foregoing fact has been observed as a result of experimentation, it is not at present understood why precalcined stacks require such a smaller proportion of plates to act as a cementitious matter than do uncalcined stacks for the production of strong ceramic ware.

The invention may be carried out by fractionating kaolinitic clay, as hereinbefore described, to separate the plates (particles of 2 microns or under) from the stacks (particles of over 2 microns). The more complete the separation, the better, but a toleration of up to 30% residual plates remaining with the stacks is permissible. The stacks fraction is calcined at a temperature of, say, 1000° C., after which the calcined stacks are mixed with uncalcined plates in the proportion of about 63% to 37%. The resulting mixture is a superior ceramic substance which can stand rapid firing with very little shrinkage and unusual freedom from cracking. It has a high degree of dimensional stability, extraordinary smoothness, and a high fired-modulus of rupture. These qualities make the mixture exceptionally well adapted as a raw material for the manufacture of excellent art ware.

I claim:

1. In a process of preparing a ceramic raw material, the steps of removing from kaolinitic clay most of the particles under 2 microns equivalent spherical diameter, and calcining the residue at temperatures from 600° to 1000° C.

2. In a process of prepaing a ceramic raw material, the steps of removing from kaolinitic clay most of the particles under 2 microns equivalent spherical diameter, calcining the residue at temperatures from 600° to 1000° C., and mixing with the calcined residue a sufficient proportion of uncalcined kaolinite particles less than 2 microns equivalent spherical diameter to bind the mixture when fired.

3. In a process of preparing a ceramic raw material, the steps of calcining at a temperature between 600° and 1000° C. kaolinitic clay having not over 30% solids content of particles smaller than 2 microns equivalent spherical diameter, and mixing with the calcined product a measured proportion of uncalcined kaolinitic particles smaller than 2 microns equivalent spherical diameter.

4. A kaolinitic clay calcined at a temperature between 600° and 1000° C. consisting substantially entirely of particles ranging in size from 2 microns to 50 microns equivalent spherical diameter.

5. A kaolinitic clay calcined at a temperature between 600° and 1000° C. consisting of at least 70% by weight of particles originally between 2 microns and 50 microns equivalent spherical diameter.

6. A ceramic material consisting of kaolinitic particles of original size between 2 microns and 50 microns equivalent spherical diameter which have been calcined at a temperature between 600° and 1000° C. in the presence of not over 30% of clay particles smaller than 2 microns equivalent spherical diameter, mixed with kaolinitic particles smaller than 2 microns equivalent spherical diameter in a ratio of weights approximately 63 to 37.

7. In a process of preparing a ceramic raw material, the steps of removing from kaolinitic clay at least 70% of the particles under 2 microns equivalent spherical diameter, calcining the residue at temperatures from 600° to 1000° C., and mixing with the calcined residue a sufficient proportion of uncalcined kaolinitic particles less than 2 microns equivalent spherical diameter to bind the large particles when the mixture is fired.

8. A ceramic raw material consisting of discrete kaolinitic stacks calcined at a temperature between 600° and 1000° C. and mixed with a sufficient portion of raw kaolinitic plates to bind the mixture when fired.

9. A friable kaolinitic clay product at least 70% of the particles of which are between 2 and 50 microns equivalent spherical diameter and which has been calcined at temperatures between 600° and 1000° C.

10. A friable kaolinitic clay product at least 70% of the particles of which are between 2 and 10 microns equivalent spherical diameter and which has been calcined at temperatures between 600° and 1000° C.

11. A ceramic raw material consisting of a friable kaolinitic clay constituent at least 70% of the particles of which are between 2 and 50 microns equivalent spherical diameter and which has been calcined at temperatures between 600° and 1000° C., and a second constituent consisting of raw kaolinitic clay particles less than 2 microns equivalent spherical diameter.

References Cited in the file of this patent

UNITED STATES PATENTS

| 1,446,238 | Yumara | Feb. 20, 1923 |
| 2,041,721 | Norton | May 26, 1936 |
| 2,179,154 | Lyons | Nov. 7, 1939 |
| 2,585,116 | Gronroos | Feb. 12, 1952 |
| 2,801,183 | Kantzer | July 30, 1957 |

FOREIGN PATENTS

| 15,834 | Great Britain | of 1894 |
| 18,911 | Great Britain | of 1889 |
| 461,837 | Great Britain | Feb. 27, 1937 |